(12) United States Patent
Vinegrad et al.

(10) Patent No.: US 10,042,278 B2
(45) Date of Patent: Aug. 7, 2018

(54) ELECTROSTATIC INK COMPOSITIONS

(71) Applicant: HP Indigo B.V., Amstelveen (NL)

(72) Inventors: Adi Vinegrad, Ness Ziona (IL); Yaron Grinwald, Ness Ziona (IL); Gil Bar-Haim, Ness Ziona (IL); Mirta Perlman, Ness Ziona (IL); Alina Grishman, Ness Ziona (IL); Danny Feldman, Ness Ziona (IL); Eyal Shelef, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/547,758

(22) PCT Filed: Apr. 28, 2015

(86) PCT No.: PCT/EP2015/059235
§ 371 (c)(1),
(2) Date: Jul. 31, 2017

(87) PCT Pub. No.: WO2016/173632
PCT Pub. Date: Nov. 3, 2016

(65) Prior Publication Data
US 2018/0031995 A1    Feb. 1, 2018

(51) Int. Cl.
*G03G 9/12* (2006.01)
*G03G 9/13* (2006.01)
*G03G 9/08* (2006.01)
*G03G 15/16* (2006.01)

(52) U.S. Cl.
CPC .......... *G03G 9/122* (2013.01); *G03G 9/0804* (2013.01); *G03G 9/131* (2013.01); *G03G 15/163* (2013.01)

(58) Field of Classification Search
CPC ...... G03G 9/122; G03G 9/131; G03G 9/0804; G03G 13/10
See application file for complete search history.

(56) References Cited

U.S. PATENT DOCUMENTS

| | | |
|---|---|---|
| 3,405,683 A | 10/1968 | Jons et al. |
| 3,900,003 A | 8/1975 | Sato et al. |
| 4,073,266 A | 2/1978 | Arneth et al. |
| 4,342,823 A | 8/1982 | Grant et al. |
| 4,400,079 A | 8/1983 | Landa |
| 4,504,138 A | 3/1985 | Kuehnle et al. |

(Continued)

FOREIGN PATENT DOCUMENTS

| | | |
|---|---|---|
| JP | H04226477 | 8/1992 |
| JP | H05142867 | 6/1993 |

(Continued)

OTHER PUBLICATIONS

English language machine translation of WO 2011158611 (Dec. 2011).*

(Continued)

*Primary Examiner* — Christopher D Rodee
(74) *Attorney, Agent, or Firm* — Thorpe North & Western LLP (57) ABSTRACT

Herein is disclosed a magenta liquid electrostatic ink composition comprising a carrier liquid; and ink particles comprising a resin, a magenta pigment and a black pigment, wherein the black pigment is present in the composition in an amount of 0.01 to 0.5 wt % by total solids of the composition.

15 Claims, 5 Drawing Sheets

(56) References Cited

U.S. PATENT DOCUMENTS

| | | | |
|---|---|---|---|
| 4,690,539 | A | 9/1987 | Radulski et al. |
| 5,712,068 | A | 1/1998 | Dalal et al. |
| 5,749,032 | A | 5/1998 | Landa et al. |
| 5,803,958 | A * | 9/1998 | Katsen ............... C09D 11/322 106/31.65 |
| 6,120,959 | A | 9/2000 | Sugizaki et al. |
| 6,620,566 | B1 | 9/2003 | Yamauchi |
| 6,623,902 | B1 | 9/2003 | Ben-Avraham et al. |
| 8,440,379 | B2 | 5/2013 | Roditi et al. |
| 2005/0053857 | A1* | 3/2005 | Nakamura ............... G03G 9/09 430/108.21 |
| 2006/0075925 | A1* | 4/2006 | Stoffel ............... C09D 11/322 106/31.27 |
| 2007/0020545 | A1* | 1/2007 | Bossidan ............... G03G 9/09 430/108.21 |
| 2012/0009516 | A1 | 1/2012 | Ganapathiappan et al. |
| 2013/0288175 | A1 | 10/2013 | Chun et al. |
| 2013/0288177 | A1* | 10/2013 | Ganapathiappan ...... G03G 9/16 430/137.22 |

FOREIGN PATENT DOCUMENTS

| | | |
|---|---|---|
| JP | H09241554 | 9/1997 |
| WO | 2007130069 | 11/2007 |
| WO | WO-2011158611 A1 * | 12/2011 ............. G03G 9/125 |
| WO | WO-2012032847 A1 * | 3/2012 ............. G03G 9/122 |
| WO | 2012134457 | 10/2012 |
| WO | 2013044991 | 4/2013 |
| WO | 2013107498 | 7/2013 |

OTHER PUBLICATIONS

English language machine translation of WO 2012/032847 (Mar. 2012).*

International Search Report and Written Opinion dated Jan. 28, 2016 for PCT/EP2015/059235; Applicant Hewlett-Packard Indigo B.V.

Data Sheet from Cabot Corporation, Monarch 800, Special Black—Medium Color Pigment Black, 2002, http://twinstar-corp.com/wp-contact/uploads/2012/05/cabot-carbon-black/MONARCH_800.

Data Sheet from Clariant Pigments, Permanent Carmine Feb. 2, 2013, http://www.printing.clariant.com/bu/pigments/PDS_Pigments.nsf/www/DS-OSTS-7SHDRW?open.

Webpage from Chemical Book, Pigment Red 122, 980-26-7, http://www.chemicalbook.com/ChemicalProductProperty_EN_CB1512302.htm.

Webpage from Chemical Book, Pigment Red 146, 5280-68-2, http://www.chemicalbook.com/ChemicalProductProperty_EN_CB0292069.htm.

* cited by examiner

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface is typically on a cylinder and is often termed a photo imaging plate (PIP). The photoconductive surface is selectively charged with a latent electrostatic image having image and background areas with different potentials. For example, an electrostatic ink composition including charged ink particles in a liquid carrier can be brought into contact with the selectively charged photoconductive surface. The charged ink particles adhere to the image areas of the latent image while the background areas remain clean. The image is then transferred to a print substrate (e.g. paper) directly or, more commonly, by being first transferred to an intermediate transfer member, which can be a soft swelling blanket, which is often heated to fuse the solid image and evaporate the liquid carrier, and then to the print substrate.

DETAILED DESCRIPTION

Before the ink compositions, methods, and related aspects of the disclosure are disclosed and described, it is to be understood that this disclosure is not limited to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a", "an", and "the" include plural referents unless the context clearly dictates otherwise.

As used herein, "liquid carrier", "liquid carrier,", "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of resin and pigment dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1500 V/cm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

Electrostatic Ink Compositions

In an aspect, there is provided a magenta liquid electrostatic ink composition comprising a carrier liquid; and ink particles comprising a resin, a magenta pigment and a black pigment, wherein, in some examples, the black pigment is present in the composition in an amount of 0.01 to 0.5 wt % by total solids of the composition.

In some examples, the ink particles comprise magenta pigment particles and black pigment particles dispersed in a resin matrix.

In some examples, the total solids of the magenta electrostatic ink composition comprises:
1-45 wt. % of a magenta pigment;
0.01-0.5 wt. % of a black pigment; and
40-90 wt. % resins.

In some examples, the magenta electrostatic ink composition comprises a charge director.

In some examples, the total solids of the magenta electrostatic ink composition comprises or consists of:
1-45 wt. % of a magenta pigment;
0.01-0.5 wt. % of a black pigment;
40-90 wt. % resins; and
0.02-20 wt % of at least one charge director.

In some examples, the total solids of the magenta electrostatic ink composition comprises or consists of:
1-45 wt. % of a magenta pigment;
0.01-0.5 wt. % of a black pigment;
40-90 wt. % resins;
0.02-20 wt % of at least one charge director; and
up to 10 wt % of other additives, wherein other additives lacks any other types of pigment.

In some examples, the total solids of the magenta electrostatic ink composition comprises up to 10 wt % of other additives wherein other additives lacks any other types of pigment, in some examples up to 5 wt % of other additives, in some examples up to 3 wt % of other additives, in some examples up to 2 wt % of other additives.

In some examples, the other additives comprise a charge adjuvant in an amount of less than 5 wt % of the total solids of the magenta liquid electrostatic ink composition, in some examples a charge adjuvant in an amount of less than 4.5 wt %, in some examples a charge adjuvant in an amount of less than 4.0 wt, in some examples a charge adjuvant in an amount of less than 4.0 wt %, in some examples a charge adjuvant in an amount of less than 3.5 wt %, in some examples a charge adjuvant in an amount of less than 3.0 wt %, in some examples a charge adjuvant in an amount of less than 2.5 wt %, in some examples a charge adjuvant in an amount of less than 2.0 wt % of the total solids of the magenta liquid electrostatic ink composition, in some examples a charge adjuvant in an amount of less than 1.5 wt % of the total solids of the magenta liquid electrostatic ink composition. In some examples, the other additives comprise a charge adjuvant in an amount of at least 0.5 wt % of the total solids of the magenta liquid electrostatic ink composition, in some examples at least 1 wt % of the total solids of the magenta liquid electrostatic ink composition.

Magenta Pigment

The electrostatic ink composition, either before or after having been printed on a print substrate, includes a magenta pigment. The term "magenta pigment" as used herein may indicate a magenta particulate colorant, which may be a magenta particulate colorant having in each molecule one or more aryl or heteroaryl rings, and the colorant may impart a magenta colour to an electrostatic ink composition. In some examples, the magenta pigment is a magenta particulate colorant comprising molecules selected from azo (mono and disazo), triphenyl methane, diketopyrrolopyrrole, isoindoline, polycyclic hydrocarbon, quinacridone, perylene, anthanthrone, anthraquinone, perinone pyranthrone or combinations thereof.

In some examples, the magenta pigment in the electrostatic ink composition is a mixture of a plurality of magenta pigments.

In some examples, the magenta pigment may be selected from any red pigment, any red-yellow pigment, such as Pigment Yellow 110, any red-violet pigment such as Pigment Violet 19 type γ and any orange pigment or combinations thereof.

In some examples, the magenta pigment or pigments may be selected from any red pigment.

In some examples, the magenta pigment may include a plurality of pigments that together form a magenta pigment.

In some examples, the magenta pigment or pigments are selected from Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:4, Pigment Red 48:5, Pigment Red 49:1, Pigment Red 49:2, Pigment Red 53:1, Pigment Red 57:1, Pigment Red 81, Pigment Red 112, Pigment Red 122, Pigment Red 123, Pigment Red 144, Pigment Red 146, Pigment Red 149, Pigment Red 170, Pigment Red 175, Pigment Red 176, Pigment Red 177, Pigment Red 179, Pigment Red 185, Pigment Red 190, Pigment Red 202, Pigment Red 208, Pigment Red 224, Pigment Red 254, Pigment Violet 19, Pigment Violet 23, Pigment Yellow 110 and any combination thereof.

In some examples, the composition contains Pigment Red 146 and Pigment Red 122, and, in some examples, the Pigment Red 146 is present in a greater amount than the Pigment Red 122.

In some examples, the magenta pigment or pigments are selected from pigment violet 19 type $α^I$, pigment violet 19 type $a^{II}$, pigment violet 19 type β, pigment violet 19 type γ, pigment red 177, pigment red 208, pigment red 122 and pigment violet 32, or combinations thereof.

In some examples, either the pigment in the electrostatic ink composition is a magenta pigment, or the plurality of pigments together form a magenta pigment. If a second, third etc pigment is present, the electrostatic ink composition and/or ink printed on the print substrate includes a first pigment, a second pigment, a third pigment etc which are different from one another.

In some examples, the magenta colour specification of the electrostatic ink composition is L=48.5, a=76.0, b=−3.4.

The magenta pigment may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition.

In some examples, the magenta pigment may constitute from 1 wt % to 50 wt % of the solids of the electrostatic ink composition, in some examples from 5 wt % to 40 wt % of the solids of the electrostatic ink composition, in some examples from 10 wt % to 40 wt % of the solids of the electrostatic ink composition, in some examples from 20 wt % to 40 wt % of the solids of the electrostatic ink composition, in some examples from 30 wt % to 40 wt % of the solids of the electrostatic ink composition, in some examples 25 wt % to 35 wt % of the solids of the electrostatic ink composition, in some examples 5 wt % to 20 wt % of the solids of the electrostatic ink composition.

In some examples, the solids of the magenta liquid electrostatic ink composition comprises 10-40 wt % of the magenta pigment, in some examples 10-35 wt % of the magenta pigment, in some examples 10-30 wt % of the magenta pigment, in some examples 20-30 wt % of the magenta pigment. In some examples, the solids of the magenta liquid electrostatic ink composition comprises 11-23 wt % of the magenta pigment. In some examples, the solids of the magenta liquid electrostatic ink composition comprises 11-17 wt % of the magenta pigment. In some examples, the solids of the magenta liquid electrostatic ink composition comprises 15-25 wt % of the magenta pigment.

The magenta pigment may be insoluble in the liquid carrier of the electrostatic ink composition. For example, the magenta pigment may be present as magenta pigment particles, for example magenta pigment nanoparticles, or may include a resin (in addition to the polymers described herein) and the pigment.

Black Pigment

The electrostatic ink composition, either before or after having been printed on a print substrate, includes a black pigment. In some examples, the black pigment in the electrostatic ink composition is a mixture of a plurality of black pigments.

In some examples, the "black pigment" may be any pigment which is a higher light, e.g. white light, absorbing pigment than the magenta pigment. In some examples, the black pigment is selected from any dark coloured pigment, for example, black pigments such as carbon black pigments, dark blue pigments, dark violet pigments, and brown pigments or combinations thereof. In some examples, the "black pigment" is a carbon black pigment or a brown pigment.

In some examples, the "black pigment" may be any dark coloured pigment that when added to the magenta electrostatic ink composition described herein in an amount of 0.01 to 0.5 wt % by total solids of the composition provides a deviation in colour, dE, seen in images formed using the magenta electrostatic ink composition compared to the magenta electrostatic ink composition containing no black pigment of less than 5, in some examples a dE of less than 4.

In some examples, the black pigment is or comprises carbon pigments. The carbon pigment may be any commercially available carbon pigment that provides acceptable optical density and print characteristics. In some examples, carbon pigments may include carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa-Evonik, BASF, Clariant, Sun Chemical and E.I. DuPont de Nemours and Company. In some examples, carbon black pigments include Cabot pigments such as Monarch 1400, Monarch 1100, Monarch 800, CAB-O-JET 200, Black Pearls, and Vulcan pigments; Columbian pigments such as Raven 7000 and Raven 3500; Degussa pigments such as Color Black FW 200, Raven FW S170, Special Black 6, Special Black 5, Special Black 4, and Printex 140V; and Tipure R-available from Dupont and the like.

The black pigment may constitute at least 0.01 wt % of the solids of the electrostatic ink composition. In some examples, the black pigment constitutes at least 0.02 wt % of the solids of the electrostatic ink composition, in some examples at least 0.03 wt % of the solids of the electrostatic ink composition, in some examples at least 0.05 wt % of the solids of the electrostatic ink composition.

In some examples, the black pigment may constitute from 0.01 wt % to 0.5 wt % of the solids of the electrostatic ink composition, in some examples from 0.02 wt % to 0.4 wt % of the solids of the electrostatic ink composition, in some examples from 0.03 wt % to 0.3 wt % of the solids of the electrostatic ink composition, in some examples from 0.05 wt % to 2 wt % of the solids of the electrostatic ink composition.

In some examples, the black pigment constitutes up to 0.5 wt. % of the solids in the electrostatic ink composition, in some examples up to 0.4 wt. % of the solids in the electrostatic ink composition, in some examples up to 0.3 wt. % of the solids in the electrostatic ink composition, in some examples up to 0.2 wt. % of the solids in the electrostatic ink composition. In some examples, the black pigment constitutes up to 0.15 wt. % of the solids in the electrostatic ink composition, in some examples up to 0.1 wt. % of the solids in the electrostatic ink composition.

In some examples, the black pigment constitutes about 0.07 wt. % of the solids in the electrostatic ink composition.

The black pigment may be insoluble in the liquid carrier of the electrostatic ink composition. For example, the black pigment may be present as black pigment particles, for example black pigment nanoparticles, or may include a resin (in addition to the polymers described herein) and the pigment.

The electrostatic ink composition and/or ink printed on a print substrate may lack any types of pigment other than a magenta pigment and a black pigment as described herein.

In some examples, "lacks any types of pigment other than" includes in its meaning "substantially lacks any types of pigment other than". In some examples, "lacks any types of pigment other than" means that the solids of the electrostatic ink composition and/or ink printed on the print substrate comprises less than 5 wt %, in some examples less than 3 wt %, in some examples less than 1 wt %, in some examples less than 0.5 wt %, in some examples less than 0.5 wt %, in some examples less than 0.1 wt %, in some examples less than 0.01 wt %, in some examples less than 0.001 wt %, of a pigment other than a magenta pigment and a black pigment.

In some examples, "lacks another pigment" (i.e. other than the ones stated in the electrostatic ink composition) means "substantially lacks another pigment".

Liquid Carrier

The electrostatic ink composition includes a liquid carrier. In some examples, the ink particles including the resin may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for ink particles, i.e. the ink particles including the resin and, in some examples, a pigment.

The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The ink particles of the electrostatic ink composition includes a resin. The ink particles may be chargeable particles, i.e. having or capable of developing a charge, for example in an electromagnetic field. The resin may be a thermoplastic resin. A thermoplastic polymer is sometimes referred to as a thermoplastic resin. The resin may coat the magenta pigment or magenta pigments, if more than one, and black pigment. The particles may include a core of magenta and black pigments, and have an outer layer of resin thereon. The magenta and black pigments may be dispersed throughout each resin-containing particle. The outer layer of resin may coat the magenta pigment and/or black pigment partially or completely.

The resin typically includes a polymer. The resin can include, but is not limited to, a thermoplastic polymer. In some examples, the polymer of the resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR-LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25mm steel plate-standard steel parallel plate, and finding the plate over plate rheometry isotherm at 120° C., 0.01 hz shear rate.

If resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In an example, the resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the resin constitutes about 15 to 40% by weight of the solids of the electrostatic ink composition. In another example, the resin constitutes about 60 to 95% by weight, in some examples from 80 to 90% by weight, of the solids of the electrostatic ink composition.

The resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel ® class of monomer, including Bynel 2022 and Bynel 2002, which are available from DuPont®.

The polymer having ester side groups may constitute 1% or more by weight of the total amount of the resin polymers in the resin, e.g. the total amount of the polymer or polymers having acidic side groups and polymer having ester side groups. The polymer having ester side groups may constitute 5% or more by weight of the total amount of the resin polymers in the resin, in some examples 8% or more by weight of the total amount of the resin polymers in the resin, in some examples 10% or more by weight of the total amount of the resin polymers in the resin, in some examples 15% or more by weight of the total amount of the resin polymers in the resin, in some examples 20% or more by weight of the total amount of the resin polymers in the resin, in some examples 25% or more by weight of the total amount of the resin polymers in the resin, in some examples 30% or more by weight of the total amount of the resin polymers in the resin, in some examples 35% or more by weight of the total amount of the resin polymers in the resin. The polymer having ester side groups may constitute from 5% to 50% by weight of the total amount of the resin polymers in the resin, in some examples 10% to 40% by weight of the total amount of the resin polymers in the resin, in some examples 15% to 30% by weight of the total amount of the polymers in the resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the resin can be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the pigment constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Charge Director

In some examples, the electrostatic ink composition includes a charge director. The charge director may be added to an electrostatic ink composition in order to impart and/or maintain sufficient electrostatic charge on the ink particles. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™, and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition. In some examples, the charge director imparts a positive charge on the particles of the ink composition.

In some examples, the charge director includes a sulfosuccinate moiety of the general formula [$R_{1'}$—O—C(O)CH$_2$CH(SO$_3^-$)C(O)—O—$R_{2'}$], where each of $R_1'$ and $R_2'$ is an alkyl group. In some examples, the charge director includes nanoparticles of a simple salt and a sulfosuccinate salt of the general formula MAn, wherein M is a metal, n is the valence of M, and A is an ion of the general formula [$R_{1'}$—O—C(O)CH$_2$CH(SO$_3^-$)C(O)—O—$R_{2'}$], where each of $R_{1'}$ and $R_{2'}$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of SO$_4^{2-}$, PO$^{3-}$, NO$^{3-}$, HPO$_4^{2-}$, CO$_3^{2-}$, acetate, trifluoroacetate (TFA), Cl$^-$, BF$_4^-$, F—, Cl$_4$—, and TiO$_3^{4-}$, or from any sub-group thereof. The simple salt may be selected from CaCO$_3$, Ba$_2$TiO$_3$, Al$_2$(SO$_4$), Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)3, LiClO$_4$ and LiBF$_4$, or any sub-group thereof. The charge director may further include basic barium petronate (BBP).

In the formula [$R_{1'}$—O—C(O)CH$_2$CH(SO$_3^-$)C(O)—O—$R_{2'}$], in some examples each of $R_{1'}$ and $R_{2'}$ is an aliphatic alkyl group. In some examples, each of $R_{1'}$ and $R_{2'}$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_{1'}$ and $R_{2'}$ are the same. In some examples, at least one of $R_{1'}$ and $R_{2'}$ is C13H27. In some examples, M is Na, K, Cs, Ca, or Ba. The formula [$R_{1'}$—O—C(O)CH$_2$CH(SO$_3^-$)C(O)—O—$R_{2'}$] and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the electrostatic ink composition).

None of the types of charge director, for the purposes of this disclosure, constitute a pigment.

Other Additives

The electrostatic ink composition may include another additive or a plurality of other additives. The other additive or plurality of other additives may be added at any stage of the method. The other additive or plurality of other additives may be selected from a charge adjuvant, a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

None of the types of other additives mentioned above, for the purposes of this disclosure, constitute a pigment.

In some examples, the electrostatic ink composition includes a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium tristearate and palmitate salt, available from Sigma Aldrich).

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples in an amount of less than 2.0% by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

None of the types of charge adjuvant, for the purposes of this disclosure, constitute a pigment.

Method of Forming a Magenta Electrostatic Ink Composition

In an aspect, there is provided a method of forming a magenta electrostatic ink composition.

The method may comprise:
  combining a resin, a magenta pigment and 0.01 to 0.5 wt % by total solids of a black pigment to form ink particles; and
  dispersing the ink particles in a carrier liquid to form a magenta electrostatic ink composition.

In some examples, forming the ink particles comprises mixing the resin, magenta pigment and 0.01-0.5 wt. % (total solids) black pigment with a carrier liquid. The resin, magenta pigment, 0.01-0.5 wt. % (total solids) black pigment and carrier liquid may be mixed under appropriate conditions to form ink particles in which the magenta and black pigments are dispersed in a resin matrix.

In some examples, forming the ink particles comprises grinding the resin, magenta pigment and 0.01-0.5 wt. % (total solids) black pigment in the presence of a carrier liquid. In some examples, additional carrier liquid may then be added to the composition.

Printing Process and Print Substrate

In an aspect, there is provided a method of electrostatic printing. The method may comprise:
  providing a magenta electrostatic ink composition;
  contacting the electrostatic ink composition with a latent electrostatic image on a surface to create a developed image;
  transferring the developed image to a print substrate,
  wherein the magenta electrostatic ink composition comprises:
  a carrier liquid; and
  ink particles comprising a resin, a magenta pigment and a black pigment,
  wherein the black pigment is present in the composition in an amount of 0.01 to 0.5 wt % by total solids of the composition.

Also provided is a print substrate having printed thereon an electrostatic ink composition comprising ink particles comprising a resin, a magenta pigment and a black pigment, wherein the black pigment is present in the electrostatic ink composition in an amount of 0.01 to 0.5 wt % by total solids.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

EXAMPLES

The following illustrates examples of the methods and other aspects described herein. Thus, these Examples should not be considered as limitations of the present disclosure, but are merely in place to teach how to make examples of the present disclosure.

Example 1

Preparation of a Magenta Electrostatic Ink Composition Containing 0.1 wt. % by Solids of Black Pigment An electrostatic ink composition was prepared using a lab grinding tool called attritor S1 (Union Process), by mixing the formulation set out below in Table 1:

TABLE 1

| Materials | Ink composition (wt. % of solids) | Weight attritor (g) | % NVS |
|---|---|---|---|
| Resins | 73.9 | 1355.8 | 25 |
| Magenta pigments | | | |
| 1)Permanent Carmine FBB02 | 19 | 87.18 | 100 |
| 2) Qunido Magenta 122 | 2.5 | 12.11 | 100 |
| Monarch 800 | 0.1 | 0.46 | 100 |
| VCA | 3 | 14.53 | 100 |
| DS72 | 1.5 | 7.26 | 100 |
| Sol-L | | 823.2 | |
| % NVS atr. | 25% | | |
| Total weight atr. | 2300 | 2300 | |

The 'resins' used were Nucrel 699 and A-C 5120 in a weight ratio of 4:1.

Nucrel 699 [Resin F] from Dupont—copolymer of ethylene and methacrylic acid, made with nominally 1 1 wt % methacrylic acid.

Honeywell AC-5120 [Resin ACE]—Ethylene-Acrylic Acid Copolymer with Acid number of 1 12-130 KOH/g.

Monarch 800 is a black pigment, a carbon pigment, available from Cabot.

DS72—a silica powder, available under the trade name Aerosil R 7200 from Degussa-Evonik.

VCA—an aluminium tristearate and palmitate salt, available from Sigma Aldrich.

Sol-L indicates Isopar L, an iso-parafinic oil manufactured by EXXON.

The grinding was carried out in two stages:
i) Hot stage—58° C. for 1.5 hour.
ii) Cold stage—45° C. for 10.5 hours.

This produced an ink having about 20% solids content. This ink was then diluted to 3% NVS and then the additives shown in Table 2 were added.

TABLE 2

| Additive | Amount |
|---|---|
| W-12 | 4% w/w to ink solids |
| NCD | 5.5 mg/1 g Isobar |
| Marcol | 5 mg/1 g |
| HPB | 6% w/w to ink solids |

W-12 is a Teflon powder.

NCD indicates a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

Marcol is a high viscous paraffinic oil with a viscosity of 0.83 gr/cc.

HPB—a homopolymer polyethelene wax, available under the trade name Acumist B6 from Honeywell Corporation.

Example 2

Preparation of a Reference Magenta Electrostatic Ink Composition (Containing no Black Pigment)

The electrostatic ink composition of Example 2 was prepared as the electrostatic ink composition of Example 1 except that the black pigment (Monarch 800 of Example 1) was not added.

Example 3

Preparation of a Magenta Electrostatic Ink Composition Containing 0.03 wt. % by Solids The electrostatic ink composition of Example 3 was prepared as the electrostatic ink composition of Example 1 except that 0.03 wt. % of the black pigment (Monarch 800 of Example 1) was added.

Example 4

Preparation of a Magenta Electrostatic Ink Composition Containing 0.07 wt. % by Solids The electrostatic ink composition of Example 4 was prepared as the electrostatic ink composition of Example 1 except that 0.07 wt. % of the black pigment (Monarch 800 of Example 1) was added.

Example 5

Preparation of a Magenta Electrostatic Ink Composition Containing 0.15 wt. % by Solids The electrostatic ink composition of Example 5 was prepared as the electrostatic ink composition of Example 1 except that 0.15 wt. % of the black pigment (Monarch 800 of Example 1) was added.

Figure 1:
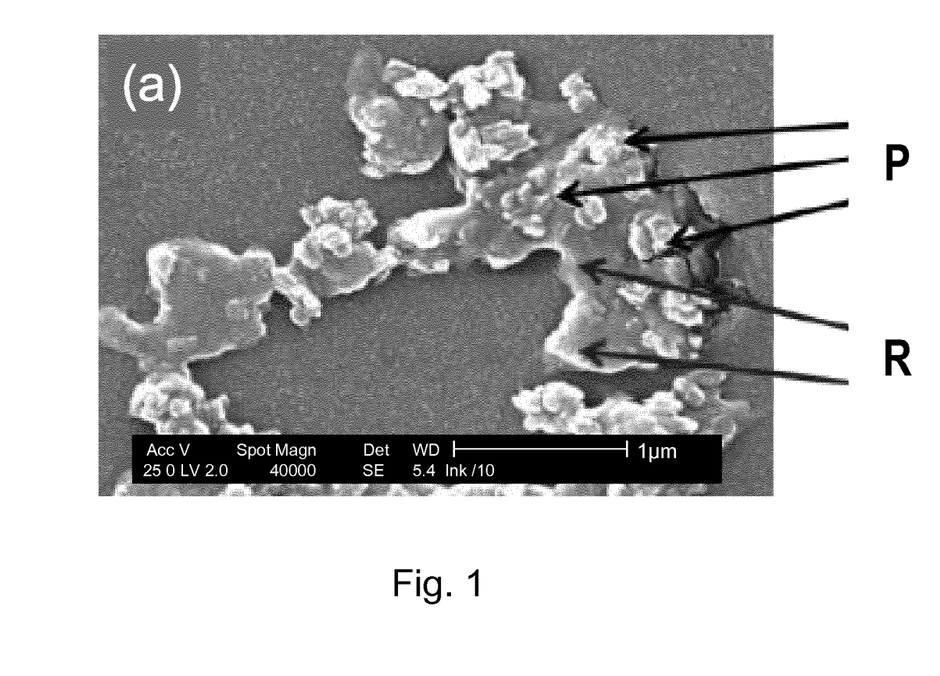
FIG. 1 shows a SEM image of an ink particle.

FIG. 1 shows an SEM image of an ink particle obtained in Example 1. FIG. 1 shows that the pigment particles P embedded in a resin R matrix.

Figure 2A:
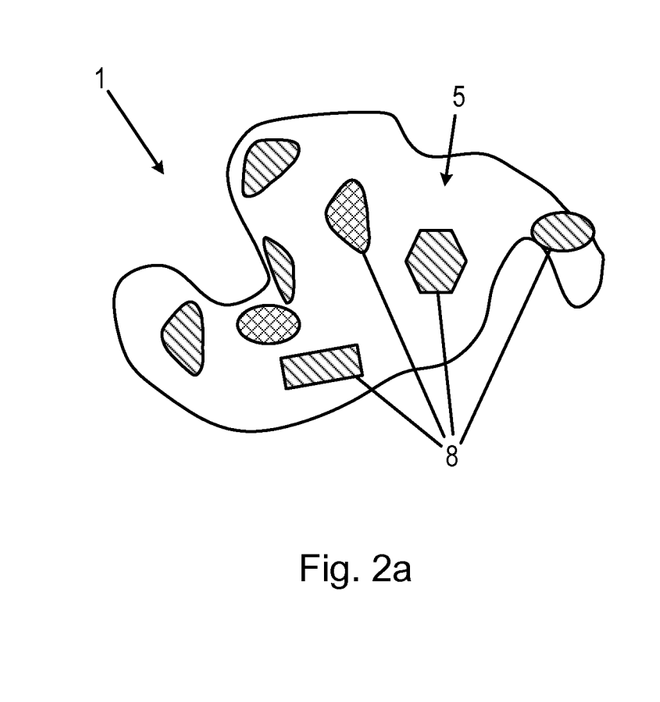
FIG. 2a shows a schematic illustration of an ink particle comprising magenta pigment particles.

FIG. 2a shows a schematic illustration of an ink particle 1 prepared according to Examples 2-5. The ink particle 1 comprises a resin matrix 5 in which magenta pigment particles 8 are embedded.

Figure 2B:
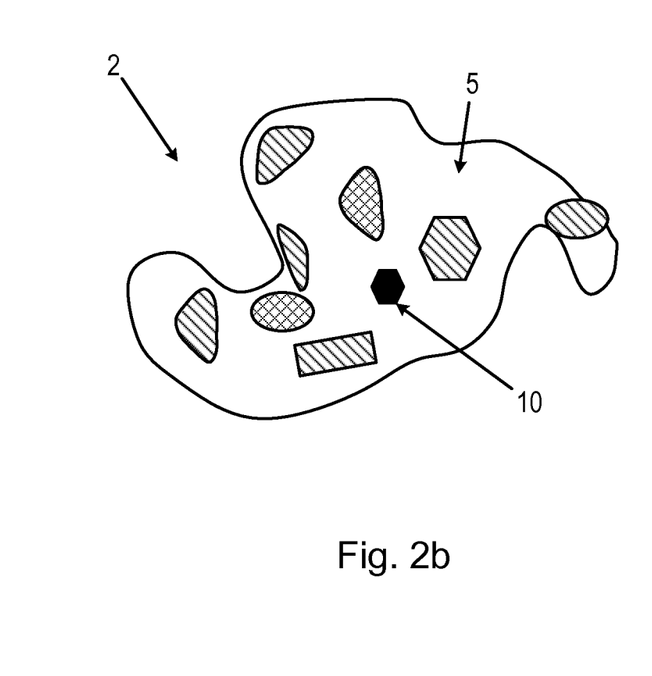
FIG. 2b shows a schematic illustration of an ink particle comprising magenta pigment particles and a black pigment particle.

FIG. 2b shows a schematic illustration of a reference ink particle 2 prepared according to reference Example 1. The ink particle 2 comprises a resin matrix 5 in which a black pigment particle 10 is embedded in addition to the magenta pigment particles 8 also shown in FIG. 2a.

Test Results

Test 1

Figure 3:
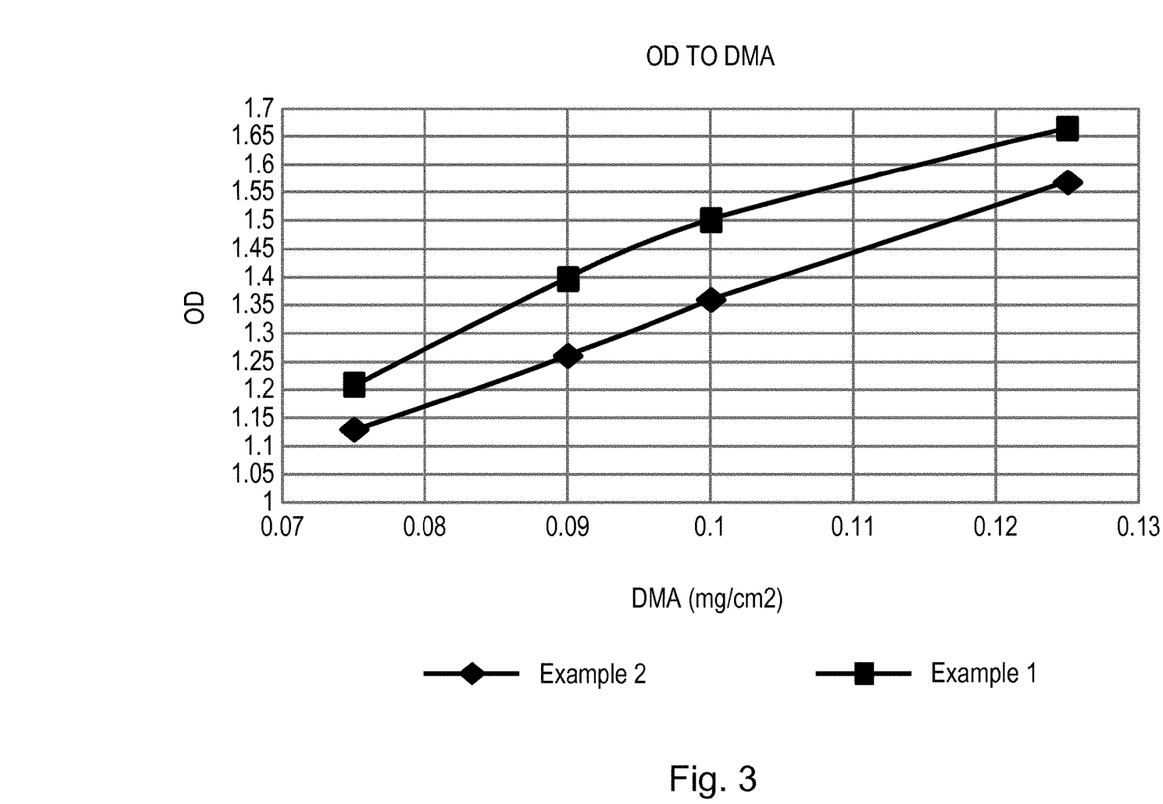
FIG. 3 is a graph showing the DMA (Developed Mass per Area) of printed images having different Optical Density (OD)

Magenta images were printed onto paper print substrates using the magenta electrostatic ink compositions of Examples 1 and 2 and an Indigo 7000 series press. Each of the magenta electrostatic ink compositions of Examples 1 and 2 was used to print four images, each of the four images having a different optical density (OD) defined on the press through a colour adjust procedure (machine protocol). The DMA of each of the printed images was then determined. The testing was then repeated for different levels of OD. The results are shown in FIG. 3.

The results show that magenta electrostatic ink compositions comprising a small amount, e.g. between 0.01 and 0.5 wt. % by total solids of the composition, of a black pigment as described herein, can be used to produce images having a target OD using less ink (a lower DMA) than would be required using a reference magenta ink composition which does not comprise a black pigment.

Test 2

Figure 4:
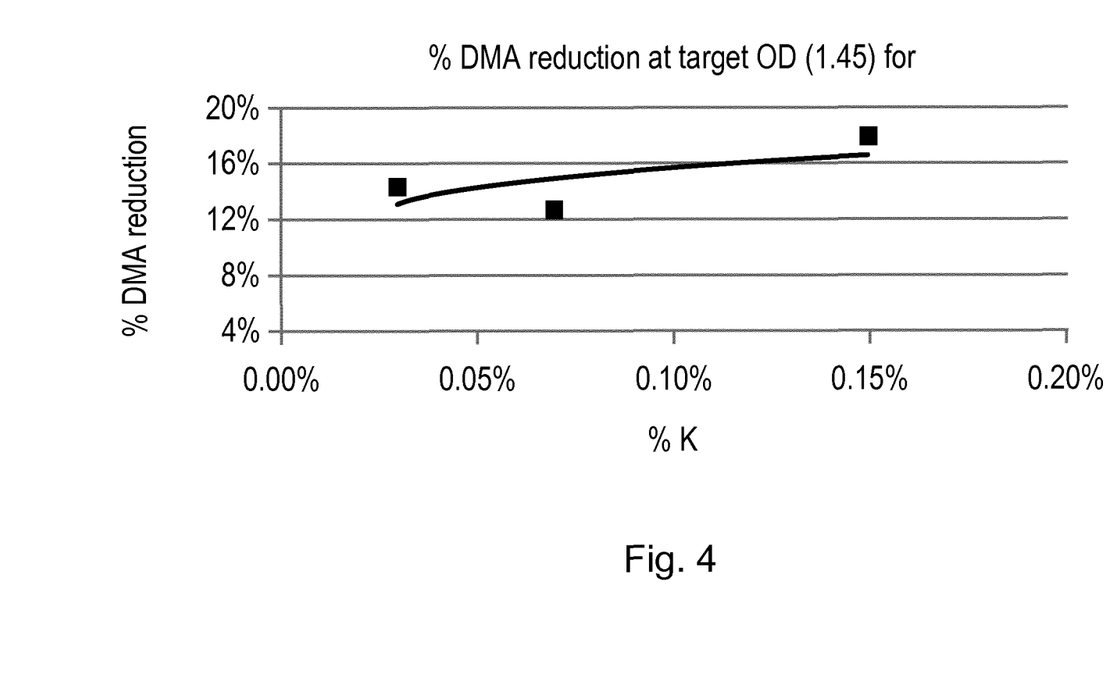
FIG. 4 is a graph showing the percentage reduction in DMA of images with an OD of 1.45 formed from magenta ink compositions comprising different amounts of black pigment compared to the DMA of an image with an OD of 1.45 formed from a reference magenta ink composition.

Magenta images were printed onto paper print substrates using the magenta electrostatic ink compositions of Examples 1 and 3-5 and an Indigo 7000 series press. Each of the images were printed to have an OD of 1.45, the DMA of each image was then determined. The results are shown in FIG. 4 which shows the percentage reduction in DMA to produce an image with an OD of 1.45 for magenta ink compositions comprising different amounts of black pigment compared to the DMA required to produce an image with an OD of 1.45 using a reference magenta ink composition. The results show that magenta electrostatic ink compositions comprising a small amount of black pigment as described herein, can be used to produce images having a required OD using less ink (a lower DMA) than would be required using a reference magenta ink composition which does not comprise black pigment.

Test 3

Figure 5:
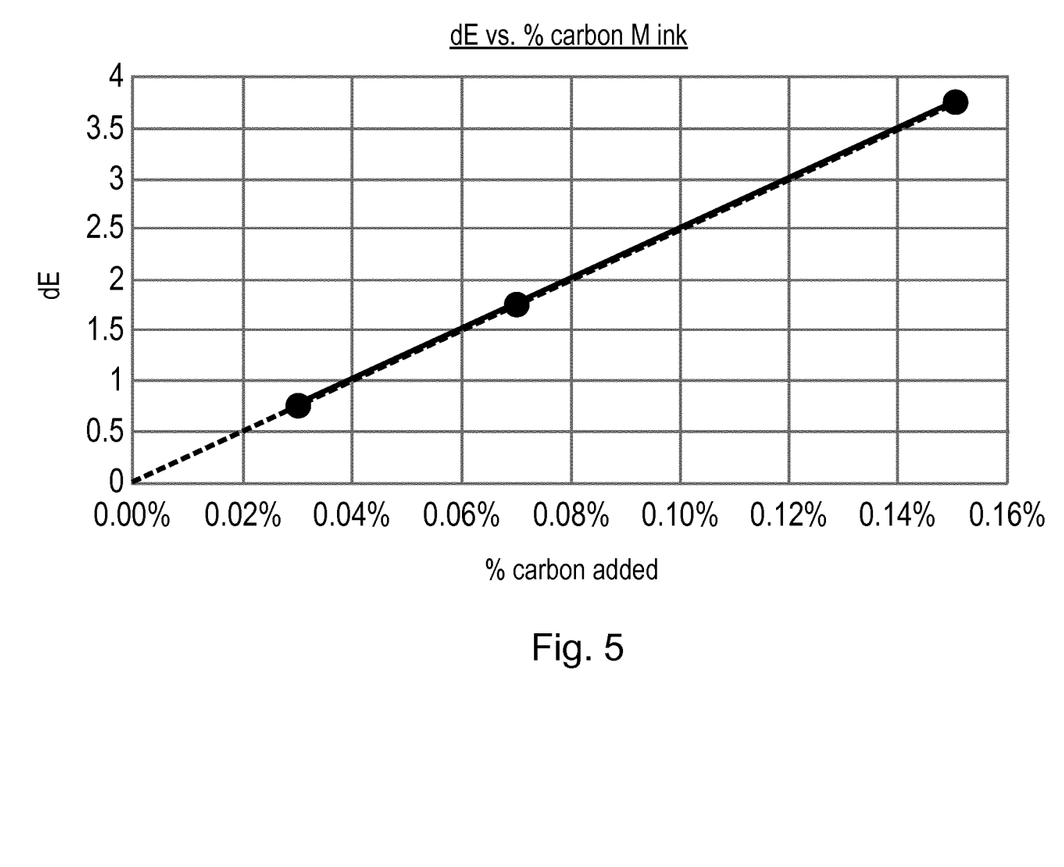
FIG. 5 is a graph showing the deviation in magenta colour for magenta ink compositions comprising different amounts of black pigment compared to the magenta colour of a reference magenta ink composition.

Using the images printed in test 2, the colour differences (dE) from the magenta images formed using the magenta electrostatic ink compositions of Examples 3-5 were measured with the x-rite 939 0°/45° Portable SpectroDensitometer. The device was placed on the printed sample and a white light pulse was initiated and the reflected light was collected and measured. The device internally converts the spectral response to L*a*b* values according to the specified illumination. dE was calculated with respect to a reference L*a*b* values for a given target OD. The reference L*a*b* values were set to the magenta electrostatic ink composition of Example 2. The results are shown in FIG. 5. These results show that the deviation in colour seen in images formed using the magenta electrostatic ink compositions described herein is at a level which is acceptable to customers.

Test 4

The CMYK colour gamut obtained with the magenta electrostatic ink compositions of Examples 2 and 4 was compared. The CMYK colour gamut obtained by using the magenta electrostatic ink composition of Example 4 (0.07 wt. % black pigment) showed almost no reduction in colour space when compared to CMYK color gamut obtained by using the reference magenta electrostatic ink composition of Example 2. The overall gamut volume was also almost equal for both ink compositions (the colour gamut volume obtained by using the magenta electrostatic ink composition of Example 4 was 2% larger than the colour gamut volume obtained using the magenta ink composition of Example 2). The CMYK color gamuts are obtained by printing and measuring the IT817.4 CMYK chart (according to ISO 12642-2:2006 "Graphic technology—Input data for characterization of 4-colour process printing—Part 2: Expanded data set"), composed of 1617 samples, for both the Reference electrostatic ink of Example 2 and the electrostatic ink composition of Example 4. The gamut volume in L*a*b* space was obtained by calculating the volume spanned by the measurements.

While the electrostatic ink compositions, methods and related aspects have been described with reference to certain examples, those skilled in the art will appreciate that various modifications, changes, omissions, and substitutions can be made without departing from the spirit of the disclosure. It is intended, therefore, that the electrostatic ink compositions, methods and related aspects be limited only by the scope of the following claims. Unless otherwise stated, the features of any dependent claim can be combined with the features of any of the other dependent claims, and any other independent claim.

The invention claimed is:

1. A magenta electrostatic ink composition comprising:
a carrier liquid; and
ink particles comprising a resin, a magenta pigment and a black pigment,
wherein the black pigment is present in the composition in an amount of 0.01 to 0.5 wt % by total solids of the composition.

2. A composition according to claim 1, wherein the ink particles comprise a magenta pigment and a black pigment dispersed in a resin matrix.

3. A composition according to claim 1, wherein the magenta pigment is selected from Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:4, Pigment Red 48:5, Pigment Red 49:1, Pigment Red 49:2, Pigment Red 53:1, Pigment Red 57:1, Pigment Red 81, Pigment Red 112, Pigment Red 122, Pigment Red 123, Pigment Red 144, Pigment Red 146, Pigment Red 149, Pigment Red 170, Pigment Red 175, Pigment Red 176, Pigment Red 177, Pigment Red 179, Pigment Red 185, Pigment Red 190, Pigment Red 202, Pigment Red 208, Pigment Red 224, Pigment Red 254, Pigment Violet 19, Pigment Violet 23, and any combination thereof.

4. A composition according to claim 1, wherein the magenta pigment comprises Pigment Red 146 and Pigment Red 122.

5. A composition according to claim 4, wherein the magenta pigment constitutes from 5 wt. % to 40 wt. % of the solids of the electrostatic ink composition.

6. A composition according to claim 1, wherein the black pigment constitutes from 0.05 wt. % to 0.2 wt. % of the solids of the electrostatic ink composition.

7. A composition according to claim 1, wherein the black pigment comprises carbon pigments.

8. A composition according to claim 1, wherein the resin includes a polymer formable from polymerising alkylene monomers and methacrylic or acrylic acid monomers.

9. A composition according to claim 8, wherein the resin includes a polymer formable from polymerising ethylene monomers and methacrylic or acrylic acid monomers.

10. A composition according to claim 1 further comprising a charge director.

11. A composition according to claim 10, wherein the charge director constitutes 0.02 wt % to 20 wt. % of the solids of the electrostatic ink composition.

12. A composition according to claim 1 further comprising a charge adjuvant.

13. A composition according to claim 12, wherein the charge adjuvant is present in an amount of 0.1 to 5 w % by weight of the solids of the electrostatic ink composition.

14. A method of forming a magenta electrostatic ink composition, the method comprising:
    combining a resin, a magenta pigment and 0.01 to 0.5 wt % by total solids of a black pigment to form ink particles; and
    dispersing the ink particles in a carrier liquid to form a magenta electrostatic ink composition.

15. A method of electrostatic printing, the method comprising:
    providing a magenta electrostatic ink composition;
    contacting the electrostatic ink composition with a latent electrostatic image on a surface to create a developed image;
    transferring the developed image to a print substrate,
wherein the magenta electrostatic ink composition comprises:
    a carrier liquid; and
    ink particles comprising a resin, a magenta pigment and a black pigment,
wherein the black pigment is present in the composition in an amount of 0.01 to 0.5 wt % by total solids of the composition.

* * * * *